United States Patent [19]
Heuring

[11] Patent Number: 5,515,498
[45] Date of Patent: May 7, 1996

[54] OPTOELECTRONIC COMPUTER GRAPHICS SYSTEM AND METHOD

[75] Inventor: Vincent P. Heuring, Boulder, Colo.

[73] Assignee: The Regents of the University of Colorado, Boulder, Colo.

[21] Appl. No.: 130,211

[22] Filed: Oct. 1, 1993

[51] Int. Cl.$^6$ .................................................. G06F 12/00
[52] U.S. Cl. ........................ 395/164; 395/141; 395/162; 359/22; 359/108; 345/32
[58] Field of Search ........................ 359/10, 9, 11, 359/22, 25, 107, 108; 369/103, 112; 365/125, 211; 348/40; 345/185, 32; 395/141, 162, 164

[56] References Cited

U.S. PATENT DOCUMENTS

| | | | |
|---|---|---|---|
| 3,608,993 | 9/1971 | DeBitetto | 359/23 |
| 4,778,262 | 10/1988 | Haines | 359/9 |
| 4,837,843 | 6/1989 | Owechko | 382/56 |
| 4,969,700 | 11/1990 | Haines | 359/9 |
| 5,028,102 | 7/1991 | Ogura et al. | 359/9 |
| 5,067,792 | 11/1991 | Lloyd | 359/32 |
| 5,159,474 | 10/1992 | Franke et al. | 359/29 |
| 5,194,971 | 3/1993 | Haines | 359/29 |

FOREIGN PATENT DOCUMENTS

| | | | |
|---|---|---|---|
| 0077030 | 3/1990 | Japan | 359/107 |

OTHER PUBLICATIONS

Article Entitled "An Optically Controlled Digital Optical Matrix Processor" By V. P. Heuring et al., SPIE vol. 1773, 1992, pp. 201–206.

*Primary Examiner*—Richard Hjerpe
*Assistant Examiner*—Lun-Yi Lao
*Attorney, Agent, or Firm*—Francis A. Sirr; Earl C. Hancock; Jennifer L. Bales

[57] ABSTRACT

An optoelectronic computer graphics system is disclosed wherein Optoelectronic Integrated Circuits (OEICs) and computer generated holograms are used to construct a final image by optically assembling a plurality of primitive image portions into the final image. The primitive portions of the final image are stored in a hologram. An optoelectronic integrated circuit means is controlled to select, and then assemble, the necessary primitive images to form the final image.

22 Claims, 12 Drawing Sheets

OPTOELECTRONIC COMPUTER GRAPHICS SYSTEM AND METHOD

This invention was made with Government support under contract ECD-9015128 awarded by the National Science Foundation. The Government has certain rights in this invention.

BACKGROUND OF THE INVENTION

1. Field of the Invention

This invention pertains to the field of computer graphics systems, and more specifically to such a system wherein Optoelectronic Integrated Circuits (OEICs) and computer generated holograms are used to provide parallel processing of image data.

2. Description of the Prior Art

A computer stored scene (for example, a scene that comprises a number of objects, such as books lying on a desk top) is digitally stored by describing the objects in terms of their three-dimensional coordinates. Prior to display, the objects are decomposed into a sequence of polygons, or other simple primitive shapes.

The above-mentioned sequence of polygons are conventionally displayed by way of converting the polygon shapes into their basic x,y, or x,y,z coordinates, and often additionally into the shade or color of the polygons. In order to visually display such a scene, these stored coordinates must first be converted into pixels. This conversion operation is time consuming and costly since there are often thousands of such primitives in a scene, each individually comprising thousands of pixels.

The present invention uses well-known OEICs as components thereof; i.e., integrated circuit devices generally comprising a two-dimensional array of input light detectors, each detector being series connected to one or more semiconductor circuit elements and to an output laser. An exemplary form of known OEIC is described in the article entitled "An Optically Controlled Digital Optical Matrix Processor", SPIE, Vol. 1773 Photonic Neural Networks (22–24 Jul. 1992) at pages 201 through 207, which article is incorporated herein by reference.

As is well known, OEICs of this type can be configured as Programmable Optoelectronic Logic Arrays (POLAs) and as Arithmetic Logic Unit Programmable Logic Arrays (ALU POLAs), such as are used in the present invention.

SUMMARY OF THE INVENTION

This invention provides a fast and inexpensive means for generating visual graphics display information, wherein OEICs and computer-generated holograms provide parallel processing of graphics image data that is digitally contained in memory in a front end digital computer. More specifically, the present invention makes use of OEICs in the form of POLAs.

In a manner well known in the art, a scene is decomposed into a sequence of polygons, which are first digitally stored into the memory portion of a front end computer by way of converting the polygons into their basic x,y, or x,y,z spatial coordinates.

A conventional optoelectronic interface unit converts the digitally-stored polygons that comprise an overall image into output bundles of light beams comprising image data and opcode. This data/opcode light output is then provided to an optoelectronic control unit (for example, a control unit of the general type that is described in the above mentioned article entitled "An Optically Controlled Digital Optical Matrix Processor", SPIE, Vol. 1773 Photonic Neural Networks (22–24 Jul. 1992) at pages 201 through 207).

This control unit is constructed in accordance with the invention to contain several two-dimensional hologram arrays (i.e., a holographic ROMs) that include not only the next address for the control unit and output control data from the control unit, as is described in the above-mentioned article, but to also contain a plurality of hyperplane or other primitive images or components. Each individual hyperplane comprises a primitive portion of a polygon.

A plurality of these polygon portions, or primitives, are selected from the array by operation of the control unit. The selected polygon primitives are then assembled by operation of Boolean AND, NAND, OR and NOR logic, as is implemented by an Arithmetic Logic Unit Programmable Optoelectronic Logic Array (ALU POLA), to thus form a final polygon as a portion of the overall final output graphic frame which usually comprises a number of different polygons.

More specifically, a first POLA operates as a hyperplane buffer register to hold a first hyperplane image as this first image is received from the above mentioned holographic ROM. The content of the hyperplane buffer is then transferred to a second POLA operating as a polygon buffer register, the hyperplane buffer is cleared, and a second hyperplane image is received by the hyperplane buffer from the above-mentioned holographic ROM.

The content of the hyperplane buffer and the content of the polygon buffer are now ANDed by operation of the ALU POLA, and the result is stored in the polygon buffer. When a complete polygon has been thus formed, the result is ORed into a third POLA operating as a frame buffer, and the polygon buffer is cleared.

This process continues until all selected polygon primitives have been assembled to form a final frame in the frame buffer. Usually, the final graphics image comprises a number of such final polygons. These additional polygons are assembled in the frame buffer by operation of the ALU POLA operating to perform an OR logic function on the content of the polygon buffer and the frame buffer.

The final graphics image is then optically read out from the frame buffer into a display; for example, by the use of a lens.

Objects, advantages and features of the invention include the use of fewer components since the images are processed in parallel and the POLA OEICs are interconnected with light beams instead of wires, a much higher speed of operation since graphics primitives are accumulated at a rate that is independent of the number of pixels in the primitives, a simple means for outputting the entire image simultaneously instead of serially, small physical size, light weight, and low power consumption.

These and other objects, advantages and features of the invention will be apparent to those of skill in the art upon reference to the following detailed description of the invention, which description makes reference to the drawing.

DESCRIPTION OF THE PREFERRED EMBODIMENT

Figure 1:
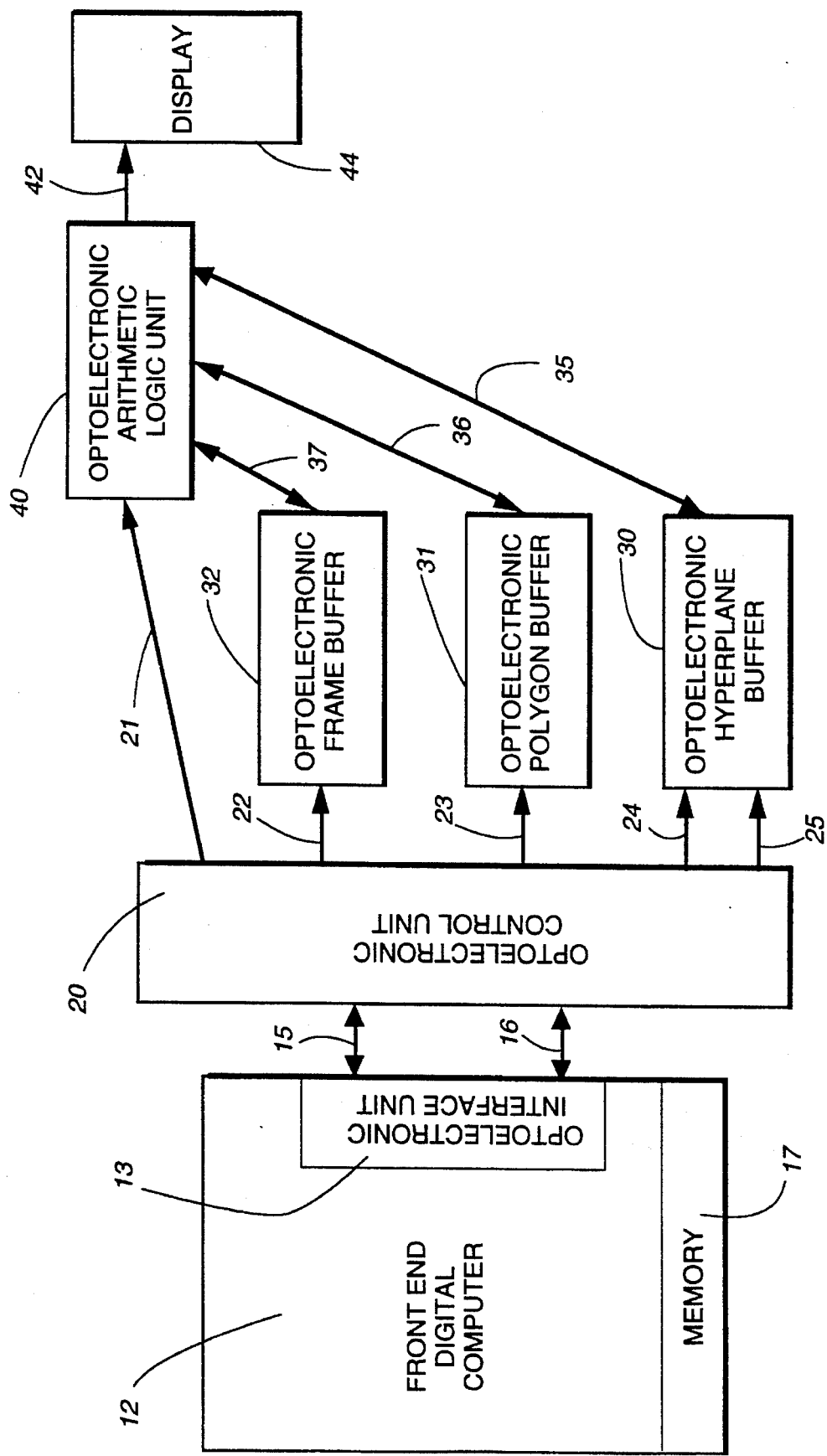
FIG. 1 is a schematic showing of the invention.

FIG. 1 provides a schematic showing of the invention; i.e., a means for generating a visual graphics display at display 44, wherein OEICs 30–32 and 40 and computer generated holograms to be described provide parallel processing of graphics image data that is digitally contained in memory in front end digital computer 12. More specifically, a sequence of polygons is first digitally stored in the memory portion of front end computer 12 by way of converting the polygons into their basic x,y, or x,y,z spatial coordinates. A conventional optoelectronic interface unit 13 converts the digitally-stored polygons that comprise an overall image into output bundles of light beams 15,16 comprising image data and opcode. Data/opcode light output 15,16 is provided to a known optoelectronic control unit 20.

As will be described, control unit 20 is constructed in accordance with the invention to contain two dimensional hologram arrays, also called holographic ROMs. A first hologram array includes the next address for the control unit (see 66 of FIG. 2), and the output control data (opcode) 21, 22, 23 and 24 from control unit 20 that operates to control POLA OEICs 40,32,31 and 30, respectively. A second hologram array includes hyperplane image data 25 that is periodically written into OEIC 30, as will be described. As will be described, each individual hyperplane (i.e., image data 25) that is written into OEIC 30 comprises a primitive portion of a final polygon frame that appears in OEIC 40.

A plurality of these primitive polygon portions are selected from the control unit's holographic hyperplane array (i.e., the second of the above-mentioned holographic array) as selected by operation of output light signals 15,16 from front end computer 12. The selected polygon primitives are then assembled by Boolean operations implemented by ALU POLA 40 to form a final polygon as a portion of the overall final output graphic frame which usually comprises a number of different polygons.

Front end computer 12 is a conventional and well-known electronic digital computer having a memory portion 17 in which one or more images (for example, one or more polygons) are stored as by defining the polygon coordinates, color, shading, etc. Computer 12 also includes hyperplane selection means. This manner of storing a graphics image in memory 17 is well known and will not be described herein.

A conventional and well-known optoelectronic interface unit 13 interfaces with front end computer 12, and operates to convert the digital graphic images that are stored in memory 17 into output bundles of light beams 15,16, which output comprises polygon data input (i.e., the x,y coordinates of a hyperplane) and control opcode input, respectively, to optoelectronic control unit 20. Control unit 20 is shown in detail in FIG. 2, and is generally of the well-known type that is described in the above-mentioned article that is incorporated herein by reference, the control unit being modified in accordance with the invention to contain a holographic hyperplane array and associated hardware.

A POLA OEIC, operating as a hyperplane buffer 30, receives both control input data 24 and hyperplane polygon primitive data 25 from control unit 20. POLA OEICs 31 and 32 operate as polygon and frame buffers, respectively. As will be described, polygon buffer 31 operates to assemble polygon primitives into one complete polygon, which complete polygon is then transferred to frame buffer 32. Usually, a final graphic frame comprises a number of individually complete polygons. In this case, such a plurality of individual polygons are assembled in frame buffer 32 in order to provide a final graphic frame as defined by a graphics image contained in memory 17 of front end computer 12.

More specifically, a first POLA 30 operates as a hyperplane buffer register to hold a first hyperplane primitive as this first primitive is received by operation of light ray bundle 24 from the above-mentioned holographic hyperplane ROM within control unit 20. The content of hyperplane buffer 30 is then transferred, by operation of light ray bundles 35 and 36, to a second POLA 31 operating as a polygon buffer register. Hyperplane buffer 30 is cleared by operation of control ray bundle 25, and a second hyperplane primitive image is received by hyperplane buffer 30 from the above-mentioned holographic hyperplane ROM by operation of light ray bundle 25.

The content of hyperplane buffer 30 and the content of polygon buffer 31 are now ANDed by operation of ALU POLA 40, and the result is stored in polygon buffer 31 (see light ray bundles 35 and 36). When a complete polygon has been thus formed in polygon buffer 31, the result is stored by operation of light ray bundles 36 and 37 in a third POLA 32 operating as a frame buffer, and polygon buffer 31 is then cleared by operation of control ray bundle 23.

This process continues until all selected polygons have been assembled to form a final frame in frame buffer 32. Usually, the final graphics image comprises a number of polygons. These additional polygons are assembled in frame buffer 32 by operation of ALU POLA 40 operating to perform an OR logic function on the content of polygon buffer 31 and frame buffer 32 (see light ray bundles 36 and 37).

The final graphics image is then optically read out from frame buffer 32 into display 44 via ALU POLA 40 (see light ray bundles 37 and 42). Display unit 44 receives light ray input 42 from ALU POLA 40, converts this input into electrical signals, and uses these electrical signals to drive a conventional visual display, such as a CRT, all of which is well known and thus will not be described herein.

Figure 2A:
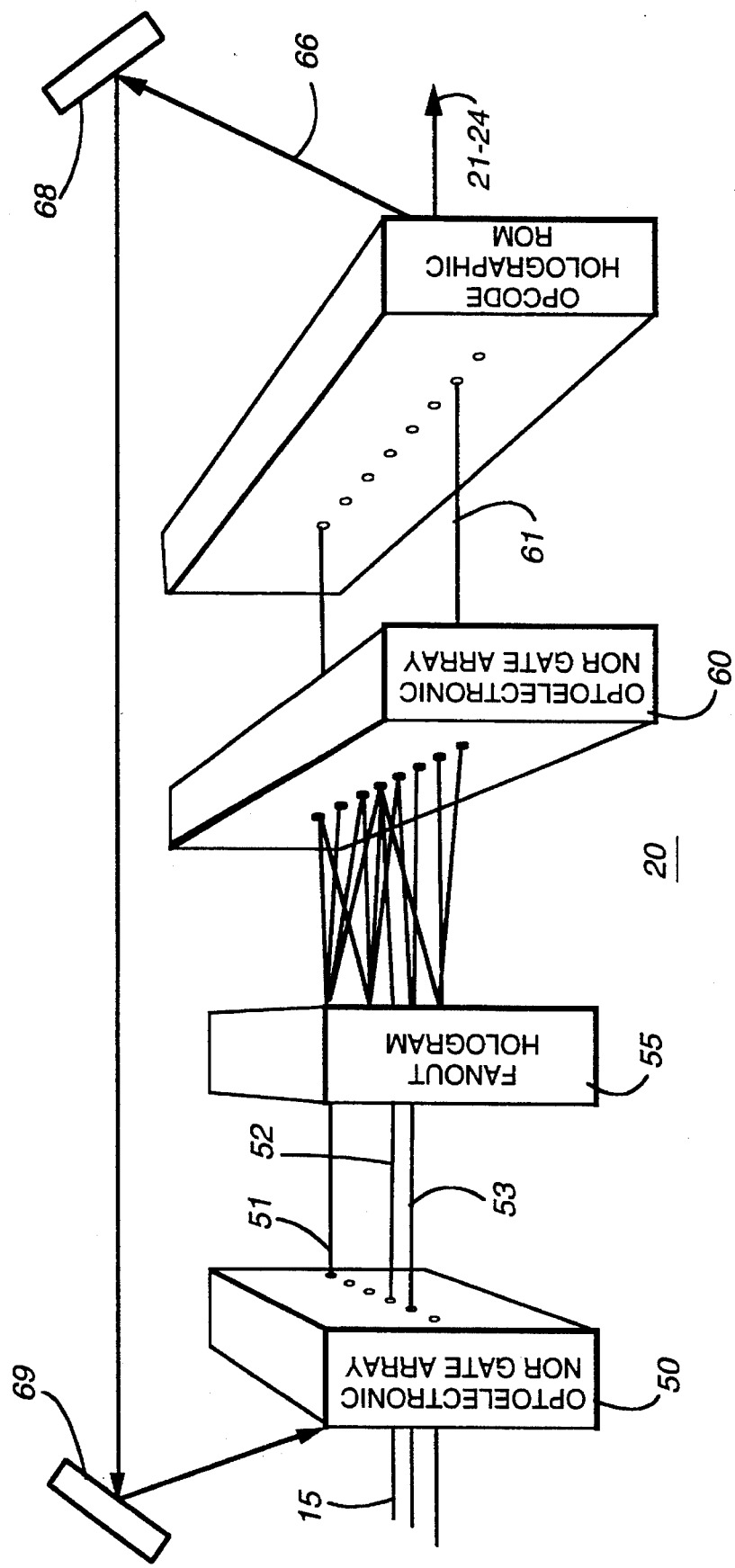
FIG. 2 shows the control unit of FIG. 1 in detail.
Figure 2B:
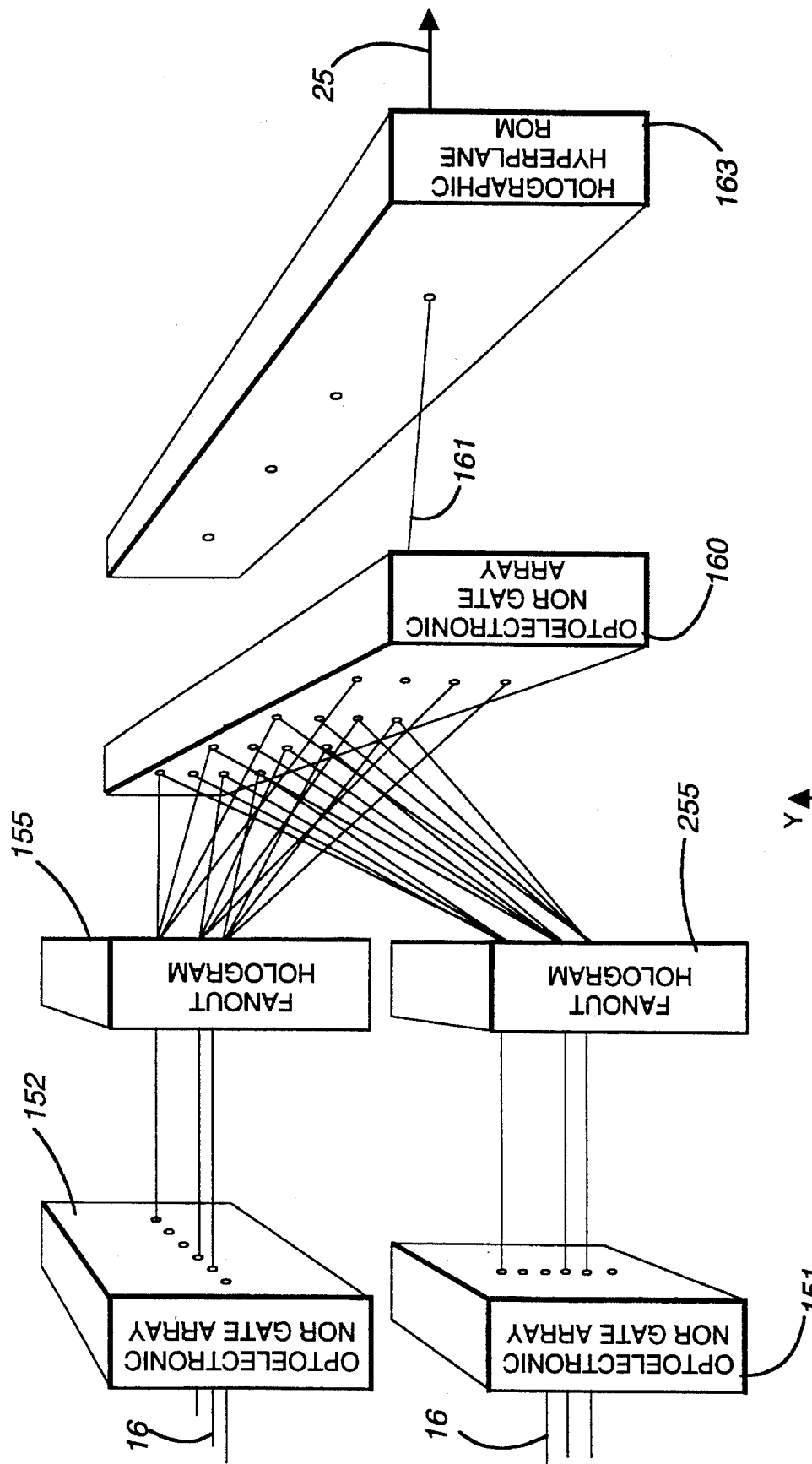

FIG. 2 shows the optoelectronic control unit 20 of FIG. 1 in detail. Control unit 20 comprises two portions; i.e., opcode portion 201 and hyperplane portion 202. Opcode portion 201 receives opcode optical input 15 from interface unit 13 of FIG. 1, and hyperplane portion 202 receives hyperplane optical input data 16; i.e., the x and y coordinate address of a hyperplane from interface 13.

Relative to opcode portion 201, optical input 15 provides an address to one hologram within opcode ROM 63; i.e., opcode input 15 operates to select one hologram within a one-row array of holograms 63, also called opcode ROM 63. Optical input 15 is provided to a dual rail optical input structure 50 (also see optical data input 15 shown in FIG. 1). Thus, an exemplary 3-bit binary address 16 of "101" for one hologram within array 63 is received as the 6-bit address "100110" in a manner well known in dual rail systems. As is well known in the art, the initial optical input 15 includes the starting address of a control sequence for control unit portion 201.

Input dual rail NOR gate array 50 comprises a first optoelectronic NOR gate array having an exemplary six input light detectors that are arranged in a row and operate to receive the exemplary 3-bit dual rail address input 15, all of this being of well-known construction. NOR gate array 50 comprises a plurality of individual gates, each individual one of which comprises, in series, an input light detector, an electronic signal amplifier, and electronic signal inverter, and an output laser. NOR gate array 50 provides this input address information 51, 52, 53 to fanout hologram 55.

As is well known to those of skill in the art, fanout hologram 55 computes the eight minterms of address information 51, 52, 53, and presents these minterms as inputs to a second NOR gate array 60 of similar construction to NOR gate array 50, the input light detectors of array 60 being arranged in a row, each member of array 60 corresponding to one hologram within array 63. The minterms computed at fanout hologram 55 select one, and only one, NOR gate of array 60; i.e., select one NOR gate that does not receive a light beam from the output of fanout hologram 55. This one NOR gate of array 60 now operates to generate an output light beam 61, as a decoded address, to one of the holograms within holographic ROM 63.

As is well known, the thus selected hologram from array 63 contains the next address 66 for control unit portion 201, this next address being applied to the input light detectors of NOR gate array 50 (for example, via mirrors 68 and 69). In addition, the selected hologram from array 63 contains the optical control information 21–24 for ALU 40, frame buffer 32, polygon buffer 31, and hyperplane buffer 30, as is shown in FIG. 1.

Relative to hyperplane portion 202, an optical input 16 provides an address to one hologram within holographic hyperplane array 163; i.e., input 16 operates to select one hologram within a one-row array 163 of holograms (also called hyperplane ROM 163). Optical input 16 is provided to two dual rail address input structures 151 and 152 (also see optical data input 16 shown in FIG. 1).

Dual rail NOR gate structures 151 and 152 are of the same general construction as dual rail opcode decoder 50. Dual rail decode structure 151 operates to decode the x coordinate of hyperplane input 16, whereas dual rail decode structure 152 operates to decode the y coordinate of hyperplane input 16.

The outputs of dual rail structures 151,152 are provided to fanout holograms 255 and 155, respectively. Fanout holograms 255,155 operate to compute the minterms of the y coordinate address and the x coordinate address, respectively. As a result, NOR gate array 160 is illuminated at all but one gate input thereof. More specifically, NOR gate array 160 is arranged in columns and rows, corresponding respectively to the x and y coordinates of hyperplane input 16. Operation of NOR gate arrays 151,152 is such that the output of y-coordinate NOR gate array 151 illuminates all but one column of inputs to NOR gate array 160, whereas the output of x-coordinate NOR gate array 152 operates to illuminate the input of all but one row of inputs to NOR gate array 160.

As a result, only one of the gates within NOR gate array 160 is activated; i.e., the gate that is located at the intersection of the above mentioned column and row does not receive light. A single light beam 161 from this one gate now operates to illuminate one of the hyperplane holograms within holographic hyperplane array 163. This illuminated hologram provides an image of its hyperplane to hyperplane buffer 30 by way of beams 25.

Stated in another way, the thus selected hologram from array 163 contains a holographic image of a hyperplane that defines one primitive portion of a graphics polygon that is currently being assembled in polygon buffer 31 of FIG. 1. Once the needed shape of the primitive polygon portion has been selected by the column address within x,y coordinate data 16, it is necessary to place this shape at the proper physical location within hyperplane buffer 30. This is done by way of the row address within x,y coordinate data 16 operating to select the proper row within a selected column of the input light detectors of NOR gate array 160.

Figure 5:
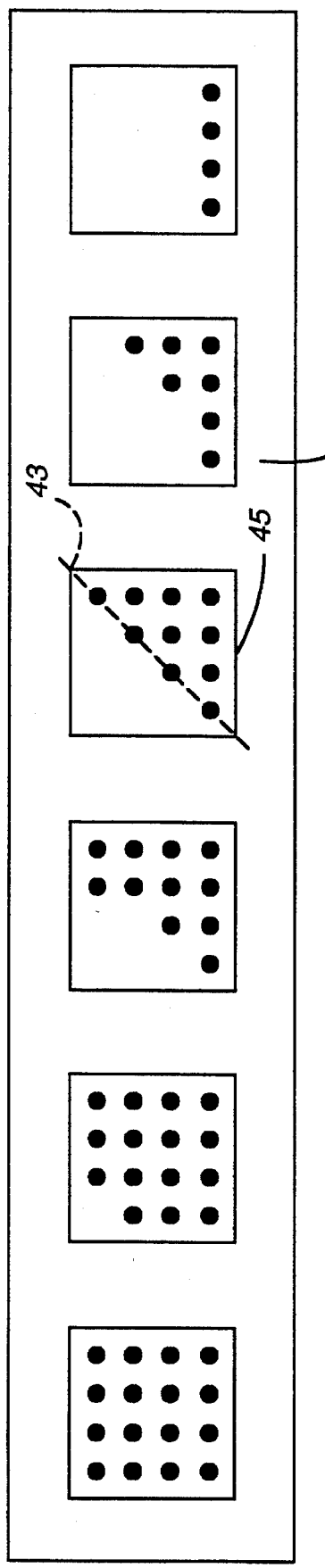
FIG. 5 is a plan view of an exemplary hyperplane holographic ROM of FIG. 2, the ROM containing, as an example, six individual hologram.
Figure 6:
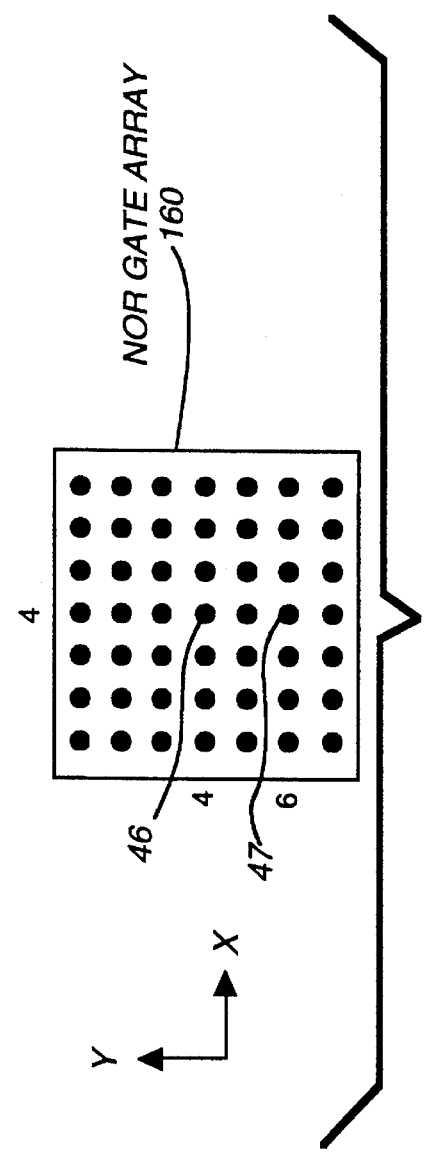
FIG. 6 is a plan view of the output lasers of an exemplary 7×7 NOR gate array of FIG. 2.

FIG. 5 is a plan view of hyperplane ROM 163 showing six exemplary holograms contained therein. ROM 163, in fact, contains many more individual holograms arranged in a linear array. FIG. 6 is a plan view of the output lasers of an exemplary seven column, seven row NOR gate array 160.

Figure 7A:
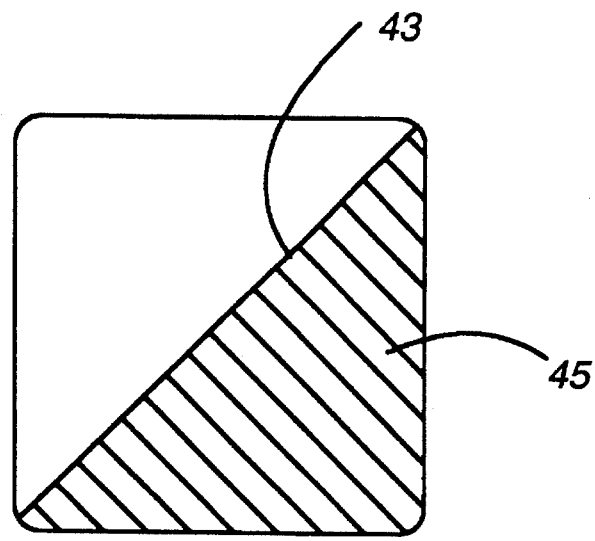
FIGS. 7a and 7b show two exemplary polygon primitives that can be produced from a selected one of the holograms in the hyperplane ROM of FIG. 5 by selective energization of the output lasers of FIG. 6, wherein laser column selection selects one of the holograms of FIG. 5, and wherein laser row selection changes the position the selected hologram in the polygon buffer of FIG. 1, thus operating to place the selected polygon primitive, and thereby the final polygon of which this polygon primitive is a portion, into a desired location in a final graphics frame.
Figure 7B:
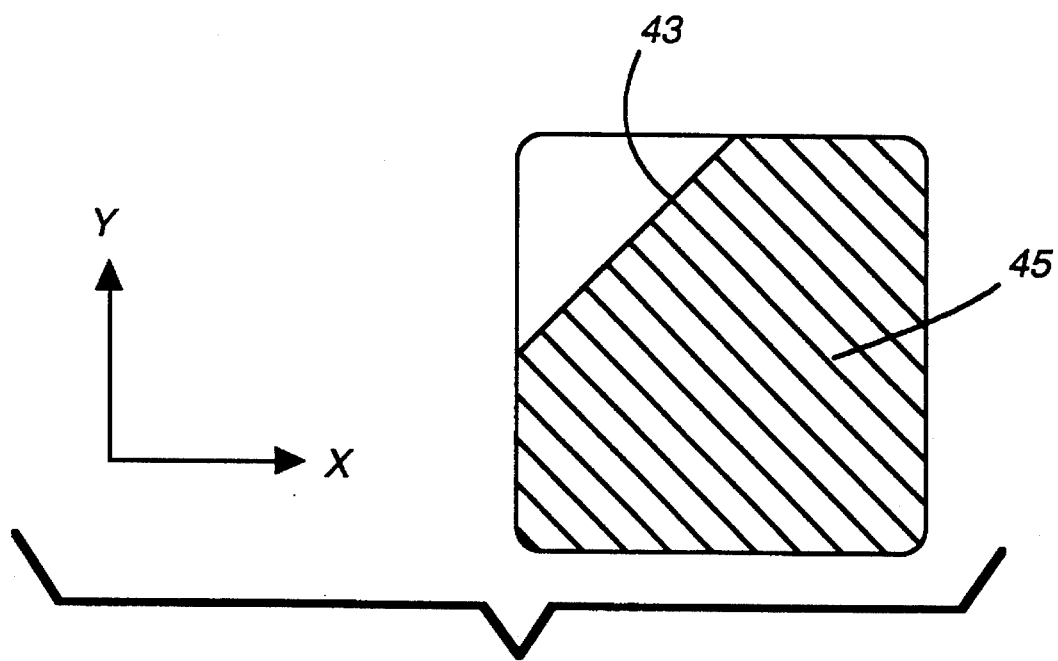

Assume now that laser 46 in column four, row four, emits decoded address light beam 161. This address selection operates to provide the exemplary polygon primitive 45 of FIG. 7a to hyperplane buffer 30 of FIG. 1. Now assume that laser 47 in column four, row six had been energized by operation of decodes 151 and 152. This address selection operates to provide the same exemplary polygon primitive 45 to hyperplane buffer 30 of FIG. 1; however, in this case, polygon primitive 45 has been moved vertically upward as is shown in FIG. 7b.

Thus, selection of the proper output laser within column four of FIG. 6 operates to locate hyperplane 45 at a required vertical position so as to site hyperplane 45 at the correct position, and thereby place hyperplane 45 into the correct position to form the requisite polygon portion (for example, in hyperplane buffer 30 of FIG. 1).

In summary, selection of an output laser column in FIG. 6 operates to select one of the polygon primitive holograms from hyperplane ROM 163 of FIG. 5, whereas selection of a laser within a selected laser column of FIG. 6 operates to place the column-selected polygon primitive at a desired vertical elevation in the process of forming a complete polygon.

Once a hyperplane has been projected on and stored in hyperplane buffer 30 of FIG. 1, this stored hyperplane is ANDed with the accumulated hyperplanes that have been previously stored in polygon buffer 31, this AND function being performed by ALU POLA 40. Once a polygon has been completed, and this will take N cycles for an N sided polygon, the completed polygon in polygon buffer 31 is ORed into frame buffer 32. Without limitation thereto, the following algorithm describes this process, wherein PB means polygon buffer 31, HP means hyperplane buffer 30, FB means frame buffer 32, and the symbol 0 means that the designated buffer is cleared.

```
repeat until FrameComplete
  begin
  PB := 0
  repeat until PolygonComplete
    HB := 0;
    HP := NextHyperplane;
    PB := PB and HP
    end;
  FB := FB or PB;
  end;
OutputFrame;
FB := 0;
```

Without limitation thereto, the following opcodes 15 would be used by front end computer 12 to communicate with control unit 20.

HPX coord ;x coordinate of hyperplane in frame coords.
HPY coord ;y coordinate of hyperplane in frame coords.

| MH | ;make hyperplane. |
| MP | ;make polygon. |
| OF | ;output frame. |

Without limitation thereto, front end computer 12 would use the following algorithm to generate a graphics frame.

```
repeat until FrameComplete
  begin
  repeat until PolygonComplete
    begin
    HPX coord;
    HPY coord;
    MHP
    end;
  MP;
  end;
OF;
```

By convention, front end computer 12 specifies whether pixels of a hyperplane frame are to be illuminated to the right/below line 43 of FIG. 5, or to the left/above line 43, by sending a positive or a negative integer coordinate specifier as part of opcode 15. In the latter case, the content of hyperplane buffer 30 is inverted by passing it through ALU POLA 40 configured to a NOR configuration. Since ALU POLA 40 has only one operand, it will perform the NOT of hyperplane buffer 30 before ANDing hyperplane buffer 30 with polygon buffer 31.

Figure 3:
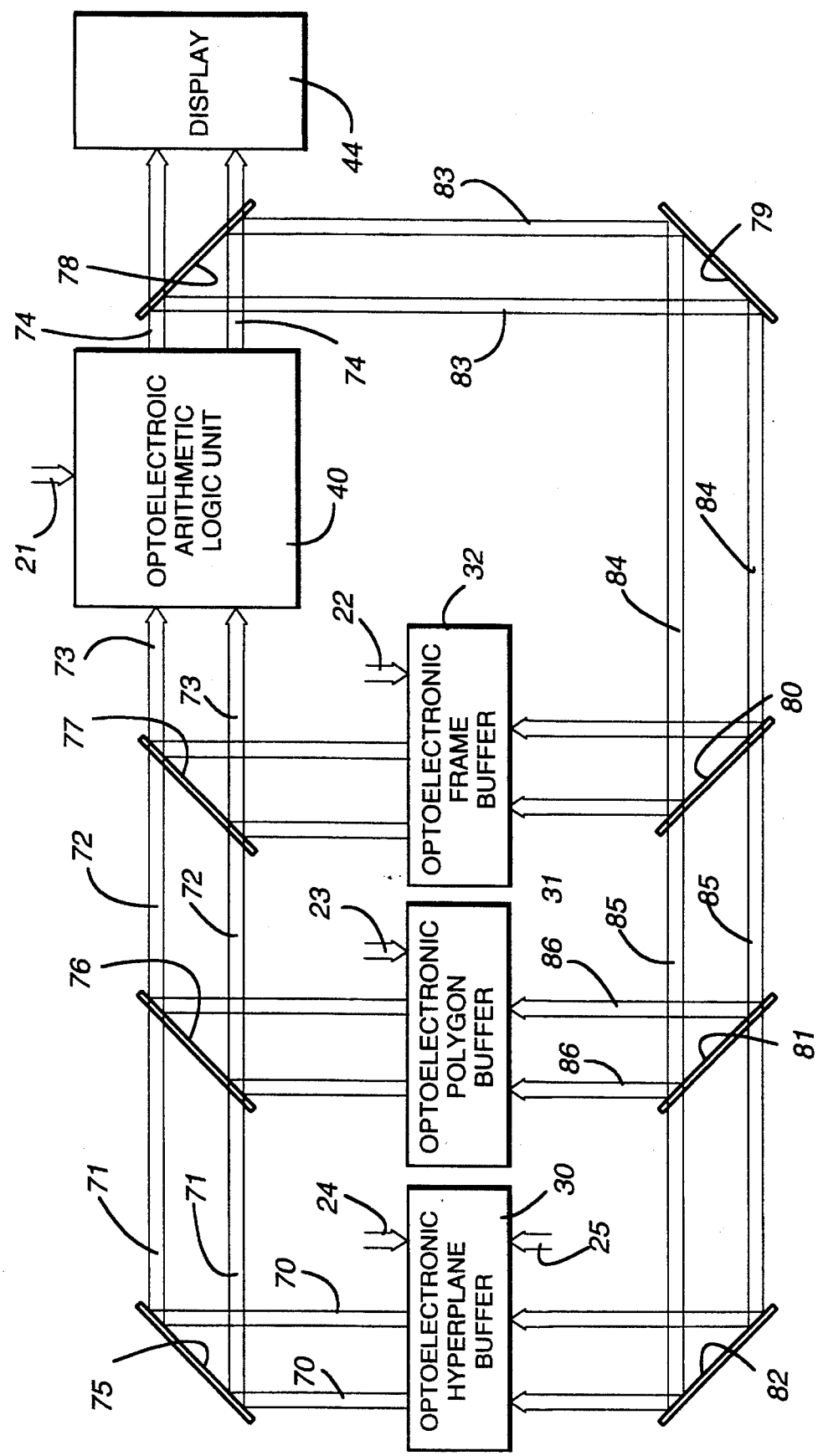
FIG. 3 shows the OEIC structure of FIG. 1 in detail.

FIG. 3 shows the OEIC POLA structure 30, 31, 32 and 40 of FIG. 1 in detail. This figure shows how hyperplane buffer 30, polygon buffer 31, frame buffer 32 and ALU POLA 40 intercommunicate via mirrors 75, 79 and 82 and beam splitters 76, 77, 78, 80 and 81. For example, when a polygon primitive is to be transferred from hyperplane buffer 30 to polygon buffer 31, light beam paths 70, 71, 72, 73, 74, 83, 84, 85, 86 effect the transfer.

Figure 4A:
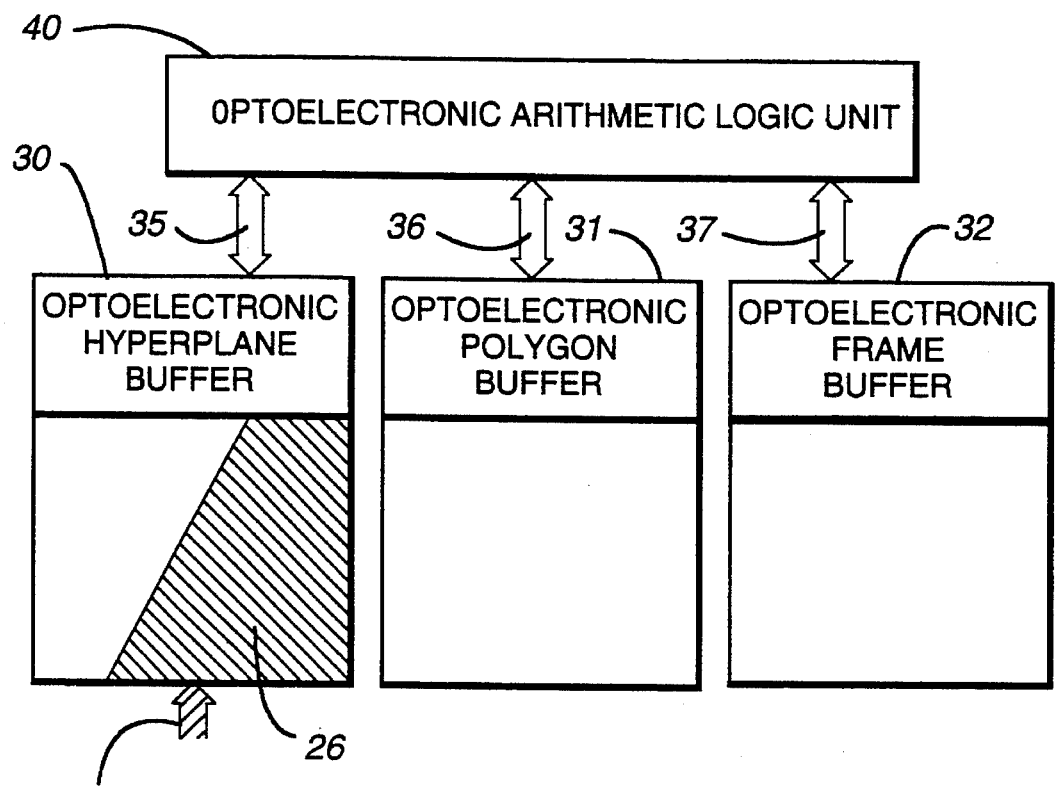
FIGS. 4a–4g illustrate how the first graphics frame of FIG. 4g is formed.
Figure 4B:
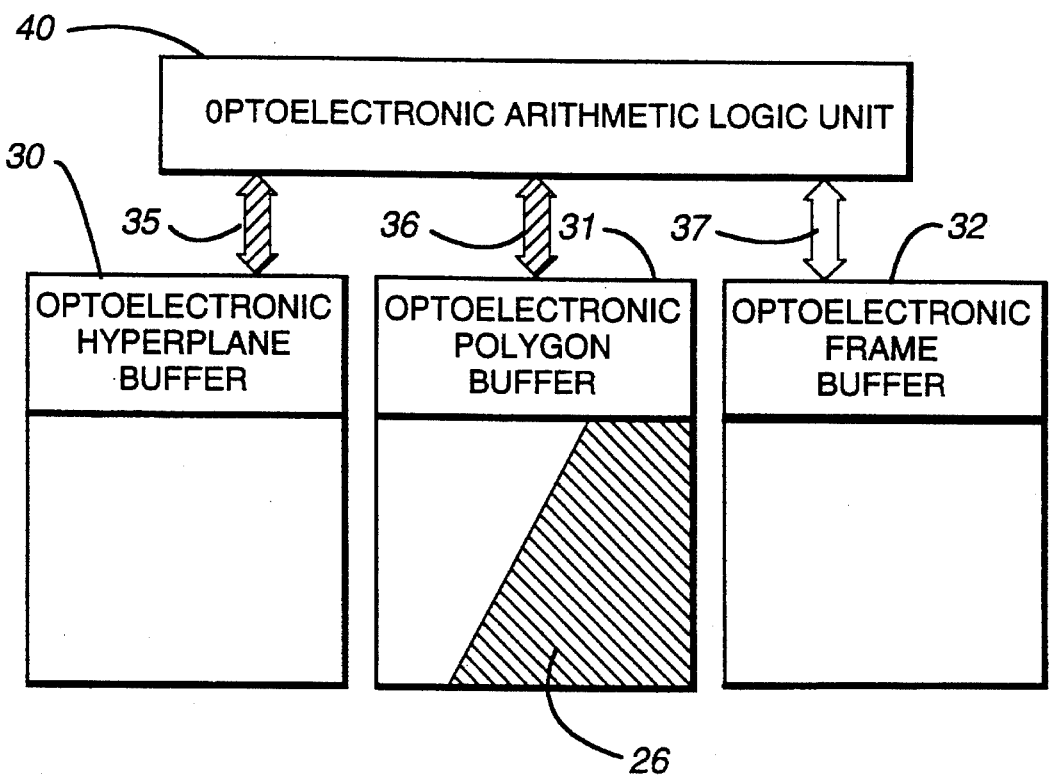
Figure 4C:
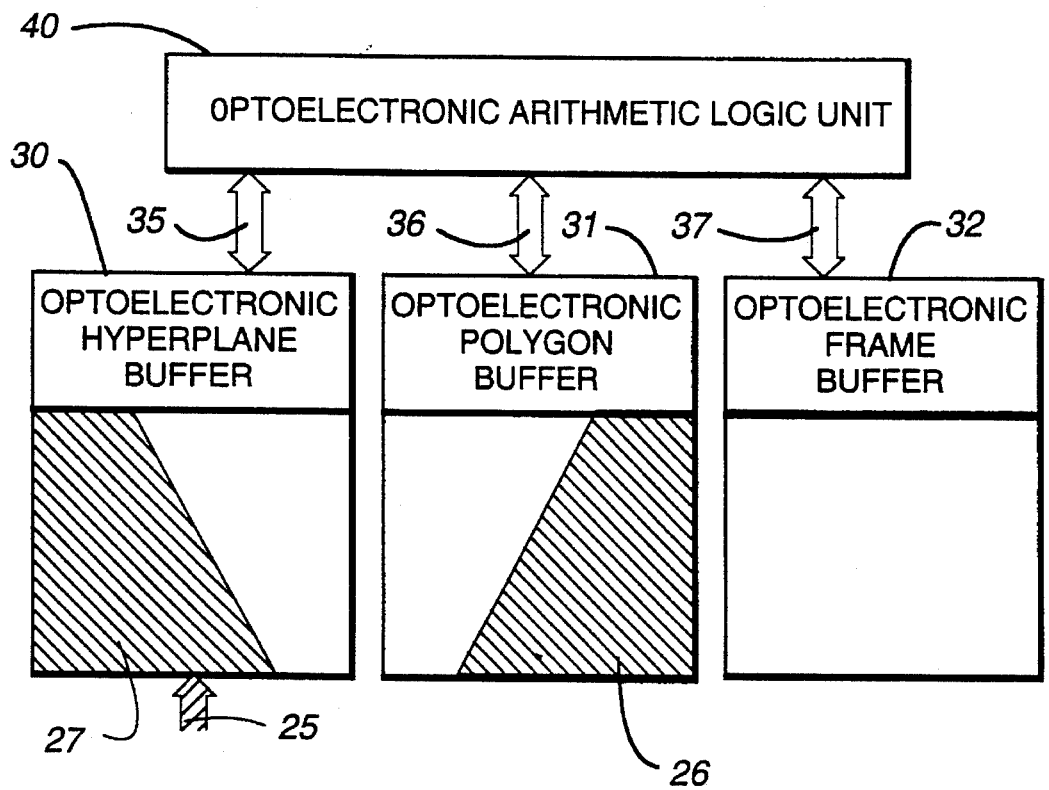
Figure 4D:
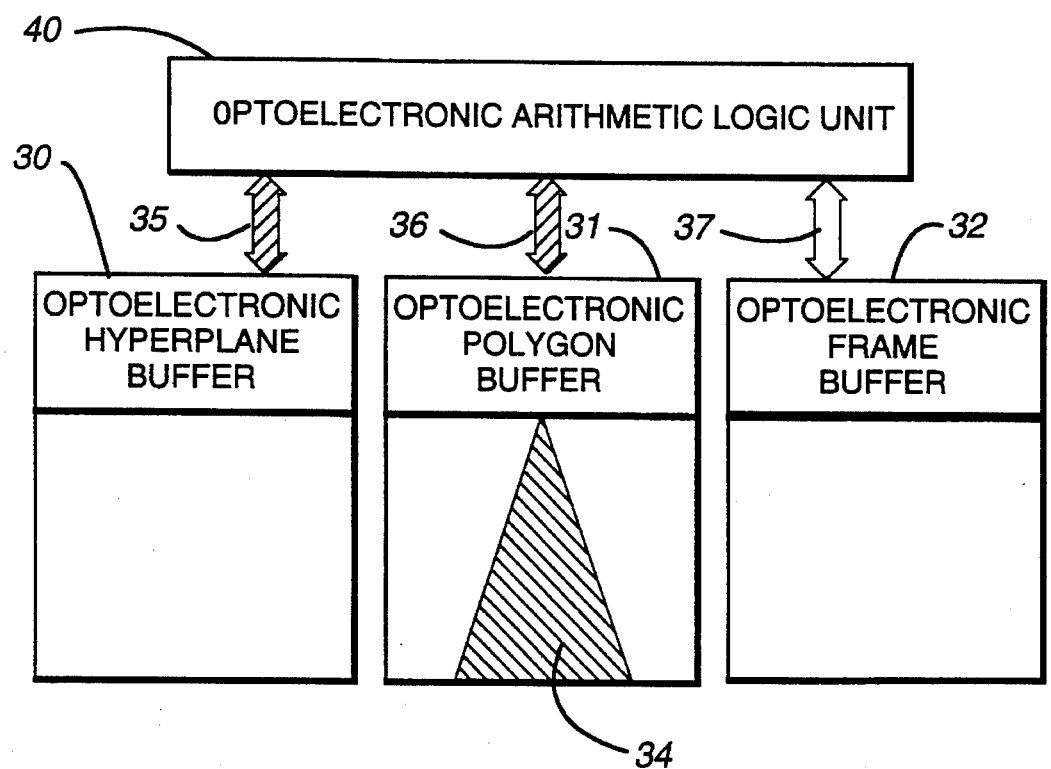
Figure 4E:
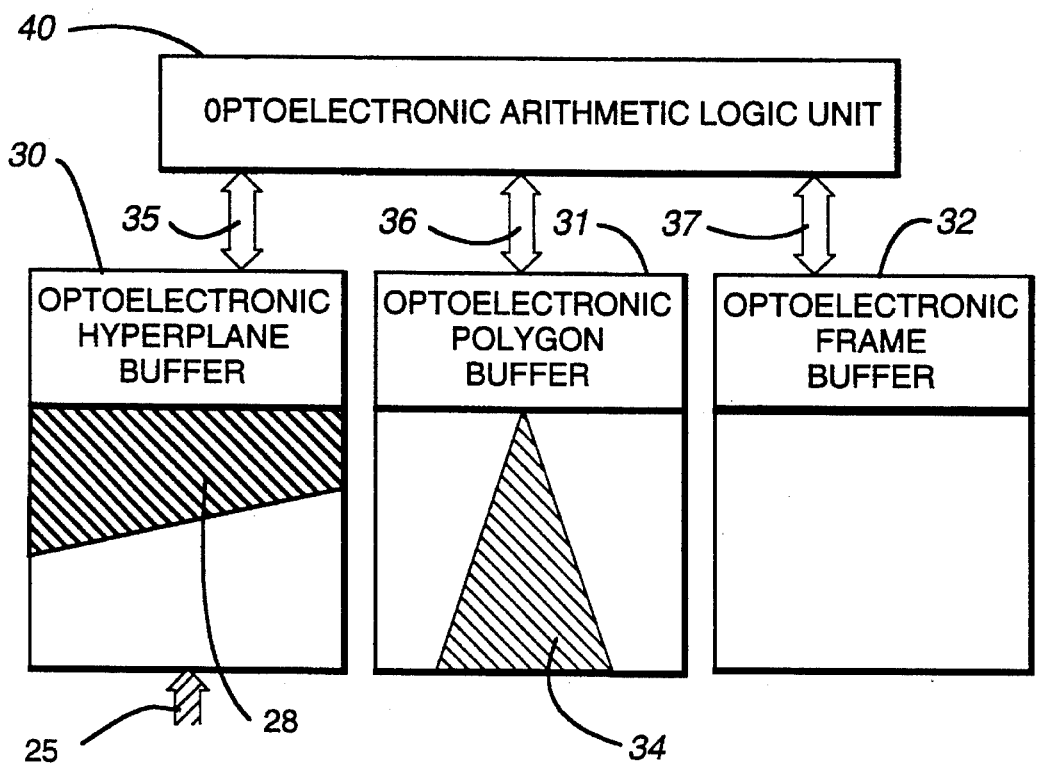
Figure 4F:
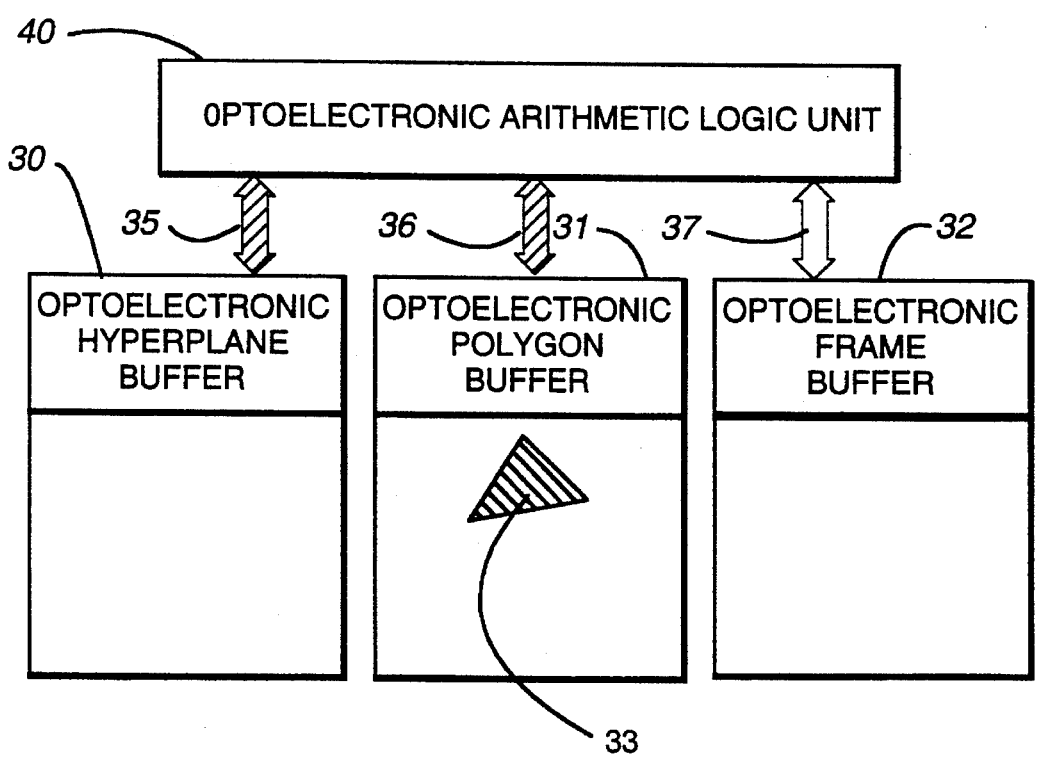
Figure 4G:
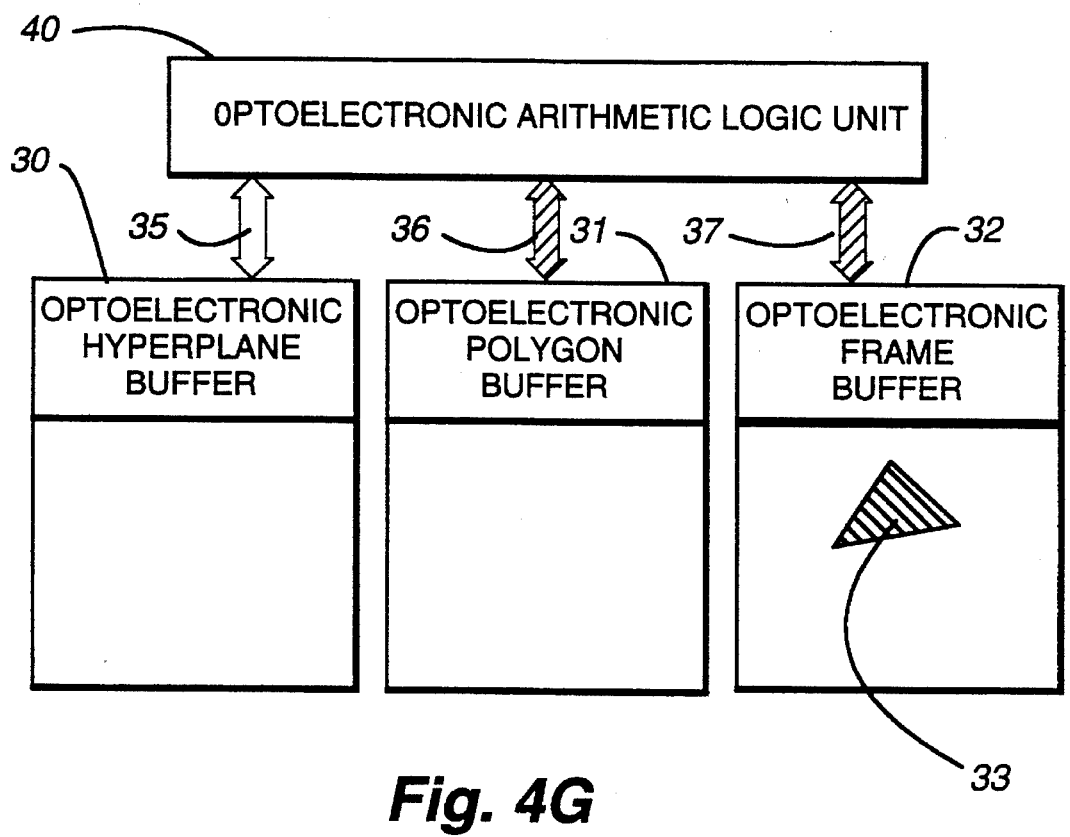

FIGS. 4a–4g illustrate how a first exemplary graphics polygon 33 (shown in FIG. 4g) is formed by assembling the three polygon primitives 26, 27 and 28 of FIGS. 4a, 4c and 4e, respectively, into polygon buffer 31, as shown in FIG. 4f, and then into frame buffer 32, as shown in FIG. 4g.

FIG. 4a shows how operation of control unit 20 provides a first hyperplane image 26 in hyperplane buffer 30 by way of hyperplane data input 25. In FIG. 4b, hyperplane 26 is transferred to polygon buffer 31 by way of light beam 35, ALU POLA 40 and light beam 36, and hyperplane buffer 30 is cleared of the hyperplane 26 shown in FIG. 4a. In FIG. 4c, a second hyperplane 27 is written into hyperplane buffer 30. In FIG. 4d, hyperplane image 26 from polygon buffer 31 has been ANDed with the hyperplane 27 from hyperplane buffer 30, using light beams 35 and 36 and ALU POLA 40, polygon buffer 31 has been cleared, and the result of this Boolean operation has been written back into polygon buffer 31 as an image 34. Hyperplane buffer 30 has also been cleared in FIG. 4d. In FIG. 4e, a third hyperplane 28 has been written into hyperplane buffer 30. In FIG. 4f, hyperplane image 28 from polygon buffer 31 has been ANDed with the image 34 from hyperplane buffer 30, using light beams 35 and 36 and ALU POLA 40, polygon buffer 31 has been cleared, and the result of this Boolean operation has been written back into polygon buffer 31 as a final polygon image 33. Hyperplane buffer 30 has also been cleared in FIG. 4f. In FIG. 4g, operation of light beams 36 and 37 and ALU POLA 40 has moved completed polygon image 33 to frame buffer 32, and polygon buffer 31 has been cleared.

Figure 4H:
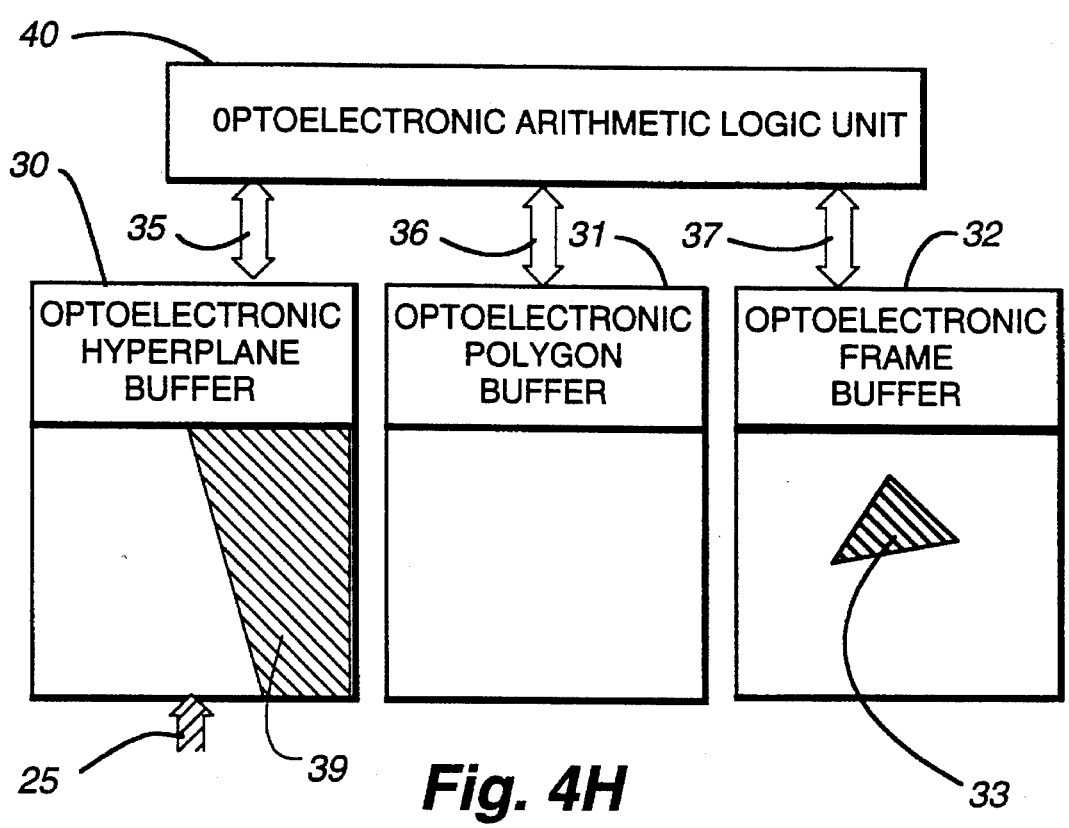
FIGS. 4h–4k illustrate how the second graphics frame of FIG. 4k is formed.
Figure 4I:
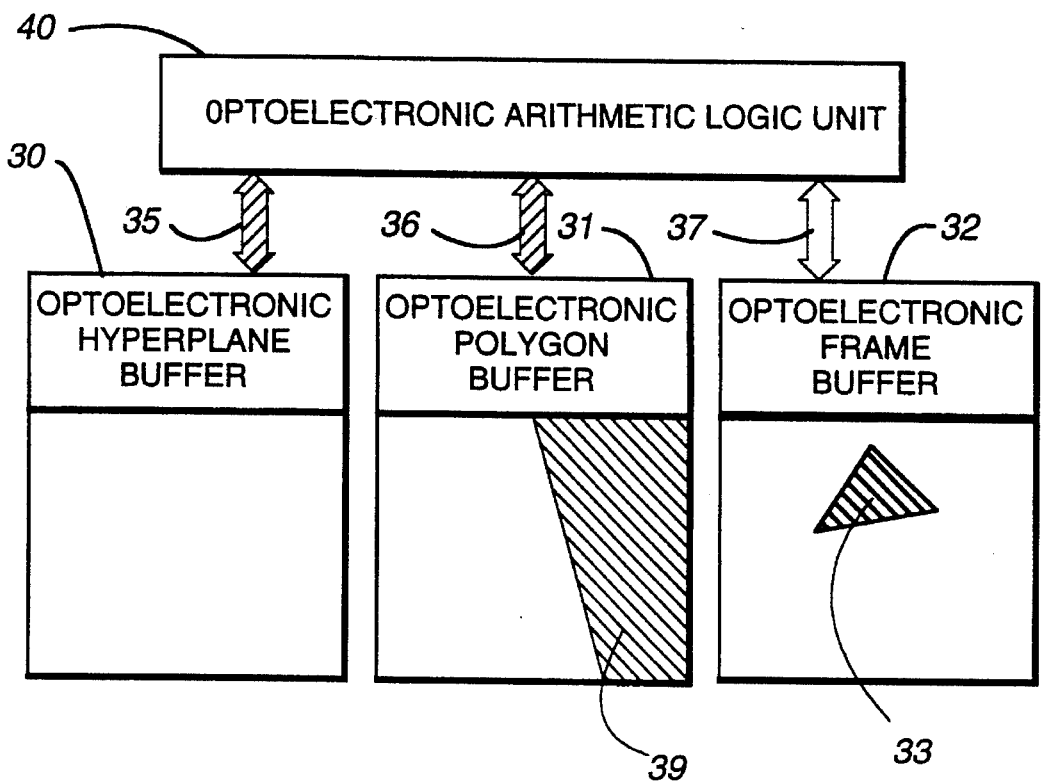
Figure 4J:
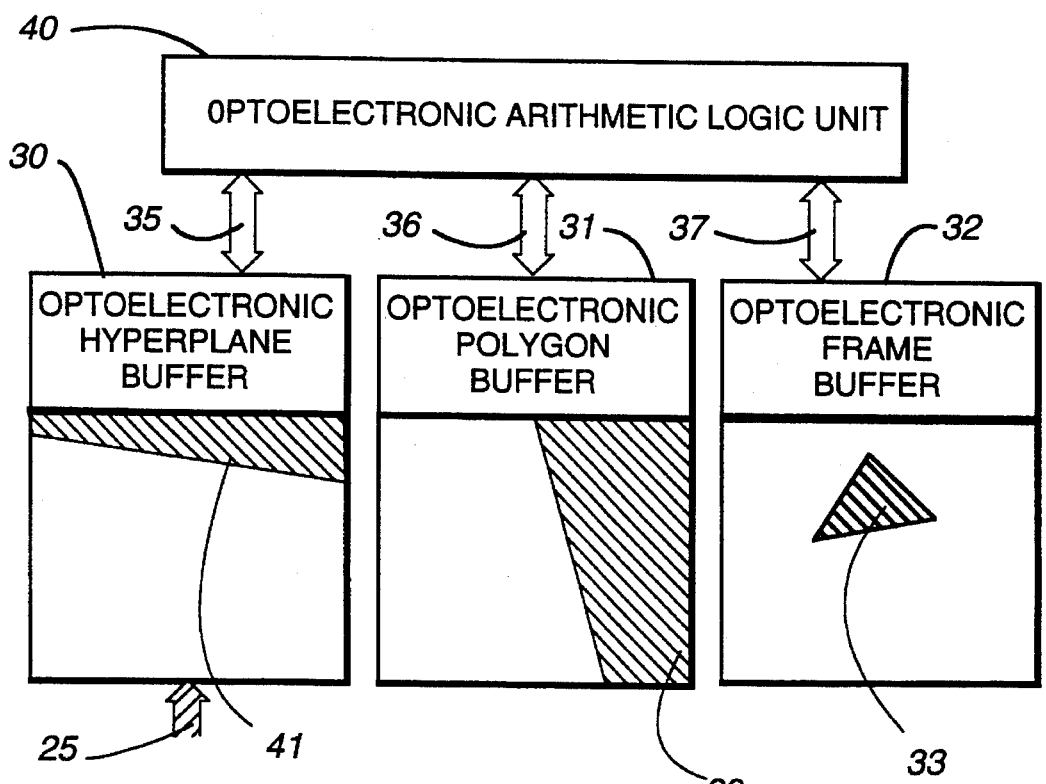
Figure 4K:
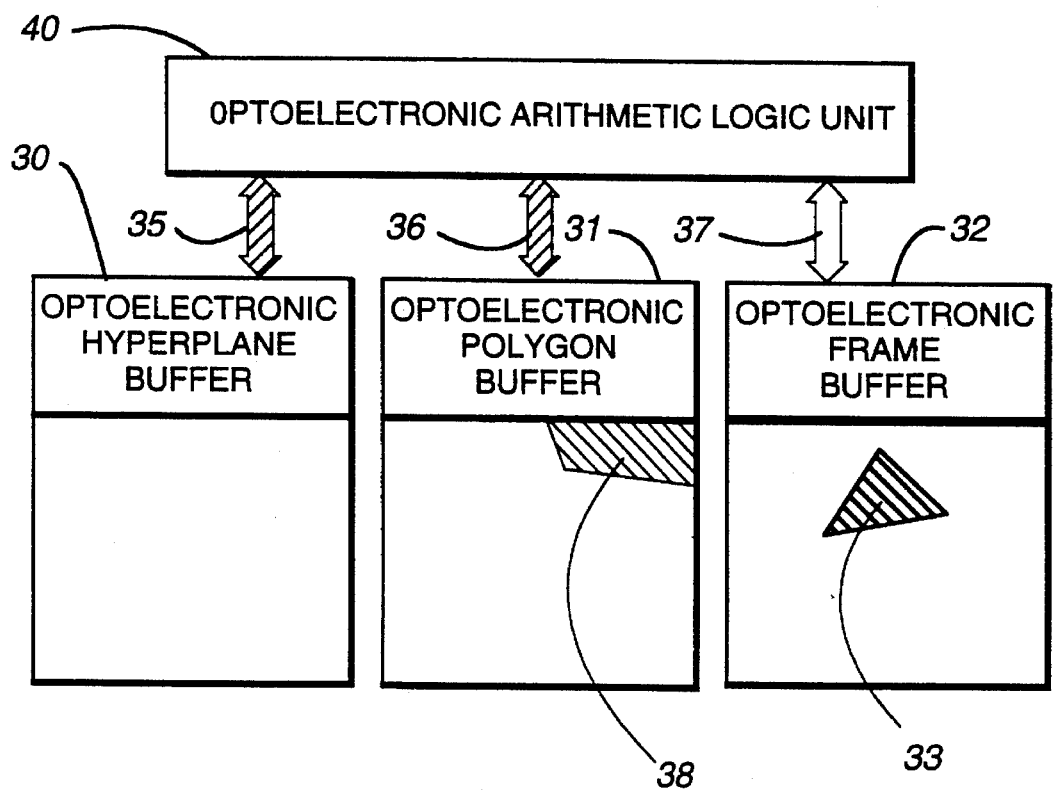
Figure 4L:
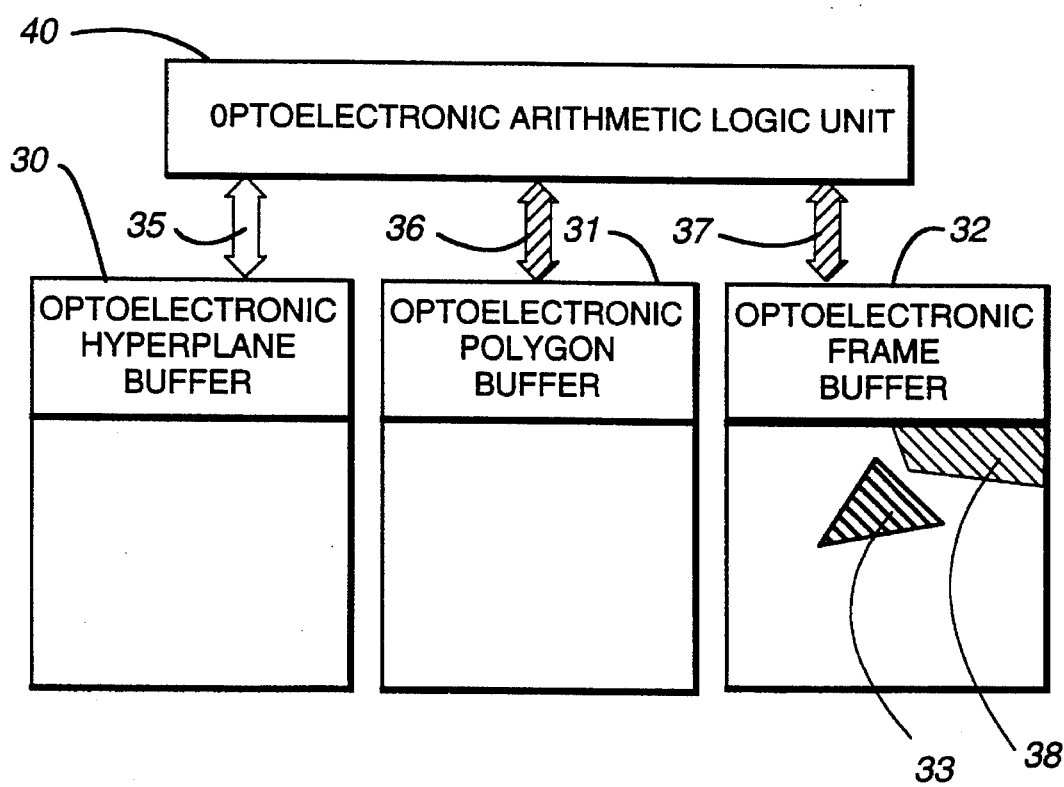
FIG. 4l illustrates how the first and second graphics frames are merged to form the final graphics frame of FIG. 4l.

FIG. 4h assumes that the graphics frame being composed includes a second polygon 38, as shown in FIGS. 4k and 4l. Thus, in FIG. 4h, a first graphics primitive 39 is written into hyperplane buffer 30. By way of operations as above described, a second graphics primitive 41 is written into hyperplane buffer 30, as shown in FIG. 4j, and graphics primitives 39 and 41 are combined to form polygon 38. In FIG. 4k and FIG. 4l, polygon 38 is ORed with polygon 33 in ALU POLA 40 and the result is placed in frame buffer 32.

The final graphics scene of FIG. 4l is now provided to display 44 for viewing. As will be understood by those of skill in the art, the final graphics scene provided to display 44 is usually much more complex than the scene shown in FIG. 4l, and the above description is not to be taken as a limitation on the invention.

While the invention has been described by making reference to preferred embodiments thereof, it is appreciated that those skilled in the art will readily visualize yet other embodiments that are within the scope and spirit of this invention. For example, it is possible within the spirit and scope of the invention to deal with well known graphics image concepts such as color, shading, and visible surface determination.

What is claimed is:

1. Apparatus for use in providing a visual graphics image from digitally-stored graphics image data, comprising;

a visual display unit, an optoelectronic control unit having a holographic hyperplane ROM that stores a plurality of hyperplane primitives, selected ones of said hyperplane primitives being logically combinable to form a selected graphics shape, said control unit being controlled in accordance with said digitally-stored graphics image data to select certain ones of said hyperplane primitives from said holographic ROM, said control unit providing light beam output means, a first programmable optoelectronic means operating as a hyperplane buffer, a second programmable optoelectronic means operating as a graphics shape buffer, a third programmable optoelectronic means operating as a final frame buffer, first means connecting the output means of said control unit to said hyperplane buffer, and operable to store hyperplane primitives therein, second means connecting the output means of said control unit to said hyperplane buffer and to said graphics shape buffer, and operable to logically assemble hyperplane primitives into a graphics shape in said graphics shape buffer, said graphics shape corresponding to said digitally-stored graphics image data, third means connecting the output means of said control unit to said graphics shape buffer and to said final frame buffer, and operable to transfer said graphics shape from said graphics shape buffer to said final frame buffer, and fourth means connecting said final frame buffer in controlling relation to said visual display unit.

2. The apparatus of claim 1 including;

a digital computer having storage means wherein said digitally-stored graphics image data is stored, optoelectronic interface means for converting said digitally-stored graphics image data to control light beam means, and means connecting said control light beam means in controlling relation to said optoelectronic control unit.

3. The apparatus of claim 2 wherein said first, second and third optoelectronic means each comprise an optoelectronic integrated circuit, each of said optoelectronic integrated circuits having light sensitive input means, light generating output means, and integrated circuit means interconnecting said input means and said output means.

4. The apparatus of claim 3 wherein said control unit light beam output means includes control means for controlling the operation of the integrated circuit means within each of said optoelectronic integrated circuits.

5. In combination;

a digital computer providing digitally-stored graphics image data, an optoelectronic interface unit connected to said digital computer and operating to convert said digitally-stored graphics image data into light beam control means, an optoelectronic control unit having light sensitive input means and light beam output means, said control unit including a holographic ROY storing a plurality of hyperplane primitives, selected ones of said hyperplane primitives being logically combinable to form a selected graphics shape, and said control unit light sensitive input means being controlled by said light beam control means from said interface unit in accordance with said digitally-stored graphics image data to thereby select hyperplane primitives from said holographic ROM corresponding to said digitally-stored graphics image data and to provide said light beam output means in accordance therewith, and optoelectronic means controlled by said light beam output means from said control unit and operable to assemble said hyperplane images into a graphics shape by operation of optoelectronic exclusive-or logic, said graphics shape corresponding to said digitally-stored graphics image data.

6. The combination of claim 5 including;

display means, and means connecting said optoelectronic means in controlling relation to said display unit for visual display said graphics shape.

7. The combination of claim 6 wherein said optoelectronic means comprises optoelectronic integrates circuits means.

8. A method for providing a human-readable visible graphics image from digitally-stored graphics image data that contains at least two primitive images, comprising the steps of;

providing a holographic ROM that contains a plurality of primitive images including said at least two primitive images, said at lease two primitive images being logically combinable to form a final graphics image that corresponds to said digitally-stored graphics image data, selecting said at least two primitive images from said ROM in accordance with said digitally-stored graphics image data so as to duplicate said digitally-stored graphics image, and assembling said selected primitive images into said final graphics image.

9. The method of claim 8 including the step of;

providing said final visible graphics image to means operable to provide a visible graphics image therefrom.

10. The method of claim 8 wherein said selecting step operates to duplicate a plurality of individual polygon shapes within said digitally-stored graphics image data.

11. In combination;

a holographic ROM containing a plurality of N holograms arranged in a row, the physical location of each hologram within said row defining N columns that extend generally normal to said row, each individual hologram providing a different primitive image, selection and combination of a plurality of different primitive images from said ROM providing an output image having a desired geometric shape, light beam generator means having a plurality of individually operable light beam output means that are arranged in N columns and M rows, each column corresponding to one of said plurality of N holograms and said rows extending generally parallel to said row of holograms, operation of a given light beam output means in a given column operating to illuminate a given one of said holograms, and operation of said given light beam output means in a given row of said given column operating to illuminate said given one of said holograms from a given angle that is determined by the row in which said given light beam output means is located, controlling means connected in controlling relation to said light beam generator means and operable to sequentially provide light beams to illuminate a sequence of said holograms as said light beam sequentially moves from one column and a row in said one column to another column and a row in said another column, and combining means operable to combine said sequence of holograms that are sequentially illuminated by said sequential light beam movement.

12. The combination of claim 11;

wherein said light beam generator means comprises a plurality of NOR gates arranged in said N columns and M rows, each of said NOR gates having an output light beam generator, and wherein said controlling means comprises means operable to sequentially activate all but one of said NOR gates to thereby cause said light beam to sequentially move from one column and a row in said one column to another column and row in said another column.

13. The combination of claim 12 including;

light sensitive input means for each of said NOR gates, storage means digitally storing image data corresponding to said output image, optoelectronic interface means controlled by said storage means and operable to convert said digitally-stored image data into output light beam means that includes sequential addresses for said input means of said NOR gates, and decode means operable to receive said output light beam means from said interface and operable to sequentially activate a corresponding addressed one of said NOR gate input means.

14. A method providing visible polygon image from a digitally-stored polygon image data, comprising the steps of;

providing a holographic ROM that contains a plurality of primitive hyperplane images, selected ones of said hyperplane images being logically combinable to form a visible polygon image that corresponds to said digitally-stored polygon image data, providing a hyperplane buffer, sequentially writing selected ones of said hyperplane images into said hyperplane buffer, providing a polygon buffer, writing the first of said sequence of hyperplane images from said hyperplane buffer into said polygon buffer, and ANDing the remainder of said sequence of hyperplane images in said hyperplane buffer with the image content of said polygon buffer and writing the result into said polygon buffer, and at the end of said sequence of hyperplane images, utilizing the image content of said polygon buffer to drive a visual display means.

15. The method of claim 14 including the step of;

moving said polygon image into a desired physical location within said polygon buffer.

16. The method of claim 15 wherein said moving of said polygon image is produced by the step of;

illuminating said holographic ROM from an angle.

17. The method of claim 14 wherein said digitally-stored polygon image data comprises data defined at least a first and a second polygon, including the steps of;

utilizing the method of claim 14 to provide an image of said first polygon in said polygon buffer, providing a frame buffer, writing the image of said first polygon from said polygon buffer into said frame buffer, utilizing the method of claim 14 to provide an image of said second polygon in said polygon buffer, ORing the image content of said frame buffer with the image content of said polygon buffer and writing the result in said frame buffer, and utilizing the image content of said frame buffer to drive said visual display means.

18. The method of claim 19 including the step of;

moving at least one of said polygons into a desired physical location within said frame buffer.

19. The method of claim 18 wherein said moving of said at least one polygon is produced by the step of;

during said step utilizing the method of claim 17 to provide an image of said at least one polygon in said polygon buffer, illuminating said holographic ROM from an angle.

20. In combination;

a holographic ROM containing a plurality of N holograms arranged in an x-direction row, the physical location of each hologram within said row defining N y-direction columns, said row and columns defining an orthogonal coordinate system, each hologram providing a different primitive image, and logical combination of a plurality of different primitive images from said ROM operating to provide an output image geometric shape geometric shape, optical NOR gate means having a plurality of individual gates arranged to form N columns and M rows, each of said gates including light sensitive input means and light generating output means, and each of said gates operating to provide an output light beam from its output means only when no input light beam is present at its input means, an optical path providing a light beam output from said NOR gate means to said ROM, optical input means providing a optical hologram selection signal having x and y coordinates, x coordinate optical decode means receiving said optical input means and operating to decode said hologram selection signal by illuminating the inputs in all but one of said rows of said NOR gate means, and y coordinate optical decode means receiving said optical input means and operating to decode said hologram selection signal by illuminating the inputs of all but one of said columns of said NOR gate means.

21. The combination of claim 20 including;

optoelectronic means operable to receive a plurality of primitive images from said ROM and to assemble said plurality of images into a geometric shape.

22. The combination of claim 21 including;

display means connected to said optoelectronic means and operable to display said geometric shape.

* * * * *